Patented Nov. 6, 1951

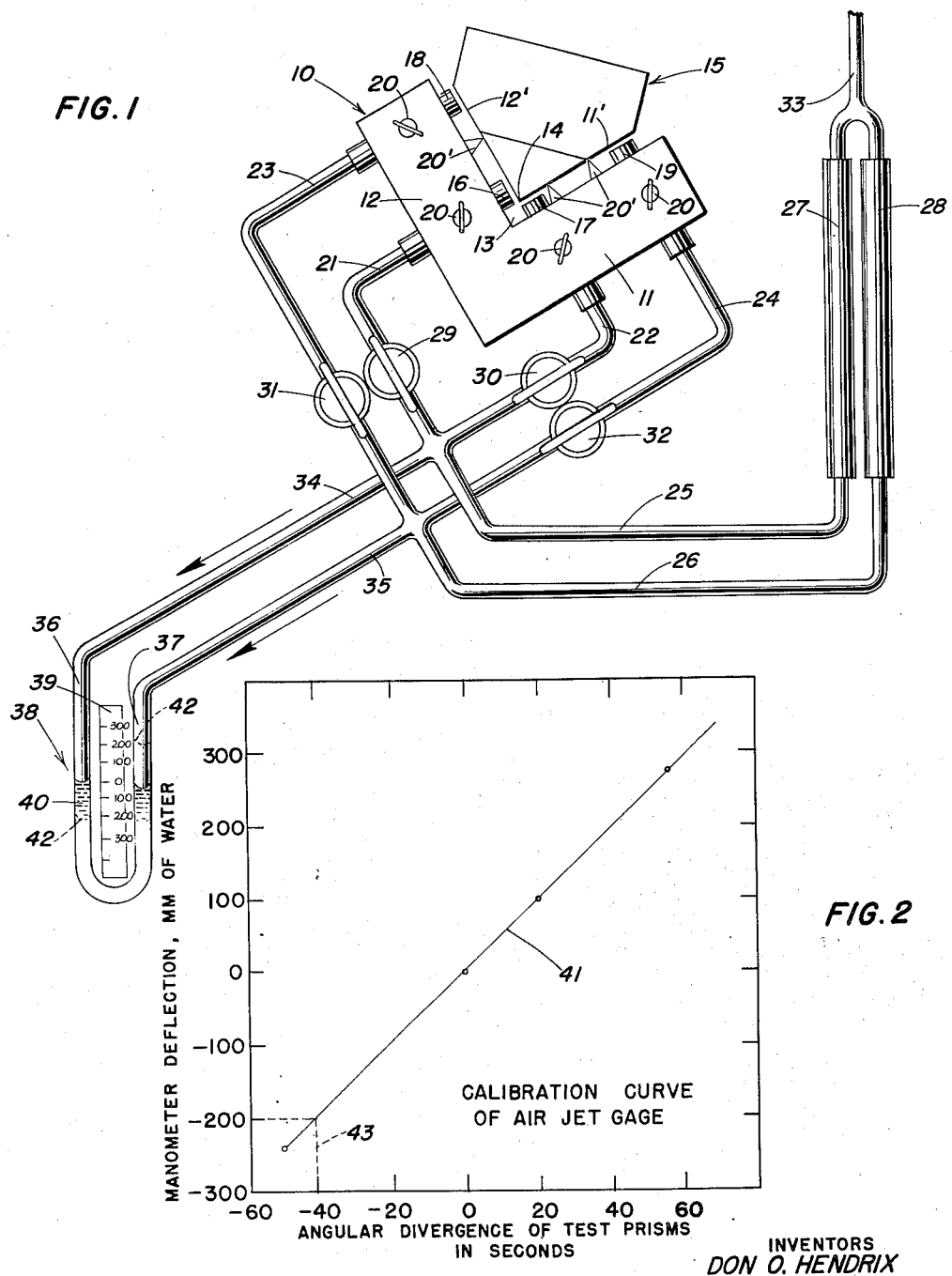

2,573,843

UNITED STATES PATENT OFFICE 2,573,843

PNEUMATIC GAUGING DEVICE

Don O. Hendrix and Rudolph M. Langer, Pasadena, Calif., assignors to the United States of America as represented by the Secretary of the Navy Application February 16, 1950, Serial No. 144,466

6 Claims. (Cl. 73—37.5)

1

This application is a continuation-in-part of a copending application, Serial No. 785,742, filed November 13, 1947, now abandoned.

The present invention relates to gauging devices and more particularly to gauging devices for rapidly and accurately checking or comparing angles.

In the manufacture of articles having angles which must conform to high standards of accuracy and which may be manufactured in large scale production quantities to within less than a second of arc of an accepted standard, it becomes necessary to provide some means for rapidly and accurately gauging such angles to determine if they are within the permissible limits of error. An example of such an article is an optical prism.

A method of checking the accuracy of linear dimensions has been heretofore in use in industry employing fluid nozzles or orifices disposed in close proximity to the surface of a workpiece to be gauged and comparing its deviation from an accepted standard by measuring the fluid leakage between the workpiece and faces of the nozzles.

The present invention contemplates the use of fluid flow in the gauging of angles by comparing them with a master angle and has as one of its objects the provision of such a gauging device which will give a rapid, accurate, indication of any deviation from the master.

Another object of the present invention is to provide a fluid gauging device for angles by means of which device the exact amount of angular error, if any, may accurately be determined.

Another object of the invention is to provide a fluid gauge for angles wherein the angular divergence from an acceptable size standard is indicated by the pressure difference between lines connected to a plurality of spaced nozzles connected in pairs and disposed in close proximity to the adjacent sides of an angle to be gauged.

Another object of the invention is to provide in such a fluid gauge for angles means for automatically compensating for fluctuations in fluid pressure or suction.

A further object of the invention is to provide an angle measuring device whose sensitivity can be regulated in accordance with the degree of error permitted.

Other objects and their attendant advantages will become apparent when the following detailed description is read in conjunction with the accompanying drawings wherein:

Fig. 1 is a diagrammatic view of one embodi-

2 ment of the present invention with a workpiece shown in place; and

Fig. 2 is a representative graph by means of which the divergence of an angular surface on a workpiece from a desired angle may be determined from pressure readings obtained.

In the embodiment illustrated the numeral 10 designates the body of the gauge which may have converging sides 11 and 12 which include between their adjacent faces an angle 13 approximately the same as the angle of a workpiece to be gauged, such as the prism 15 shown. Adjustably mounted in the sides 11 and 12 are nozzles 16, 17, 18, and 19 which are adapted to form fluid leakage paths with the adjacent sides 11' and 12' of the angle. The inner nozzles 16 and 17 are located, one on each face, close to the vertex 14 of the workpiece, the outer nozzles 18 and 19 being preferably as far from the vertex as the dimensions of the prism permit. The nozzles are slidable inwardly or outwardly for purposes to be later described and wing nuts 20 maybe provided for clamping the nozzles in place after they have been properly set. Any suitable means such as micrometer or differential screws may be employed to control the adjustment of the nozzles. Supporting means such as the spaced parallel bars 20' may be provided to support the angle in a spaced relationship with the sides of the gauge body 10 as shown. These bars may be in the form of knife edges so that a line contact is provided with the prism.

The nozzles are connected in pairs, the inner nozzles 16 and 17 being connected in parallel by means of tubes 21 and 22 and the outer nozzles 18 and 19 by tubes 23 and 24, each pair of tubes joining supply tubes 25 and 26 respectively. Air pressure or suction from a common source 33 may be applied through any suitable throttling means, such as the matched capillary tubes 27 and 28, which will limit and equalize the flow of fluid to the pairs of nozzles. Each of the tubes 21, 22, 23, and 24 are provided with valves 29, 30, 31, and 32 respectively for separately shutting off the fluid supplied to each nozzle.

Tubes 34 and 35 may connect the branch tubes 25 and 26 with a suitable pressure responsive device such as the opposite limbs 36 and 37 of a manometer 38. A scale 39 indicates the level of a fluid 40 in the manometer. The arrangement is such that the differential between the fluid levels indicates any variation in pressure in lines 34 and 35.

The operation of the apparatus is as follows: When the selected angle of a workpiece, such as the prism 15, is to be checked, a test prism having a known correct angle is first placed in the gauge and the nozzles are adjusted so that there is a clearance of about one thousandth of an inch between the faces of the workpiece angle and the orifices of each nozzle. This may be done in the embodiment illustrated by adjusting the nozzles inwardly or outwardly. The nozzles are then balanced by turning off one nozzle of each pair, for example, by closing valves 29 and 32 and adjusting the clearance between the test workpiece and the other two nozzles 17 and 18 until there is equal fluid leakage between the sides of the test prism and the nozzles as will be indicated by a zero reading on the manometer scale 39. The nozzles are then clamped in position by tightening their respective wing nuts 20. Valves 30 and 31 are now closed, the valves 29 and 32 opened, and the nozzles 16 and 19 adjusted in the same way. With all four valves then opened, the reading on the manometer should be close to zero, any final adjustment being made by changing one of the nozzles slightly.

The standard prism may now be removed and a prism to be tested may be substituted therefor. If the angle of the latter is correct the reading on the manometer will not change, but if its angle is too small there will be a greater flow through the outer nozzles 18 and 19 than through the inner nozzles 16 and 17 thus creating a differential pressure in the branch tube 34 causing the liquid 40 to rise in one limb of the manometer 38. If the angle is too large then the flow will be greater through the inner nozzles 16 and 17 and the deflection will be in the opposite limb of the manometer.

The angular error can be accurately determined by first calibrating the gauge using a given constant pressure and a plurality of prisms whose angles differ from the desired angle by definite known amounts, as would be previously determined by optical measurements or other suitable means.

By plotting a curve of manometer deflection against angular divergence a chart having a plot such as line 41 illustrated in Fig. 2 can be developed. It will be apparent that with such a chart the size or error of an unknown angle can quickly be determined by placing it in the gauge, noting the manometer deflection, and determining from the calibration chart the error present.

In Fig. 1 there is shown in dotted lines at 42 a typical manometer deflection that might be caused by a workpiece whose angular error is to be determined. On the chart this pressure differential may be indicated as 200 millimeters of water and the angular divergence can be determined by referring to the plot 41 in Fig. 2 and following the dotted line coordinates 43. In the problem given this error is found to be forty seconds minus.

It should be noted here that the sensitivity of the gauge can be varied by regulating the width of the gap between the nozzles and the sides of the workpiece. A smaller gap will increase the sensitivity and a large gap will decrease the sensitivity. Sensitivity can also be regulated by varying the fluid pressure or suction, the higher the pressure or suction the greater the sensitivity. Hence if the tolerable error is very small, the sensitivity may be increased to detect exceedingly small angular variations from the acceptable standard.

An additional feature of the invention lies in the fact that, when the four nozzles have been balanced as hereinbefore described, should a prism, be slightly rotated or displaced during the measuring process, the sensitivity of the gauge will not be affected since such rotation may decrease the clearance between the workpiece and the nozzle on one side, the clearance between the workpiece and the nozzle on the other side, will be proportionately increased thus having no effect on the ultimate manometer reading. It will be apparent therefore that a minimum of time need be employed to mount the workpiece and accurately determine any angular error.

It should be understood that many variations and modifications of the above-described invention may be resorted to without departing from the scope or spirit of the appended claims.

What is claimed is:

1. An angle gauging device for rapid measurement of angular surfaces on a workpiece comprising; a workpiece support, a pair of fluid nozzles positioned relative to said support so as to form fluid leakage paths with adjacent sides of an angle near its vertex, a second pair of fluid nozzles positioned relative to said support so as to form fluid leakage paths with the adjacent sides of an angle at points spaced from its vertex, means for providing fluid flow through all of the nozzles, and pressure indicating means connected to both pairs of nozzles, whereby variations in size between angles successively gauged cause changes in pressure at the nozzles which show on the pressure indicating means.

2. An angle gauging device for determining quickly the accuracy of a number of like angular surfaces comprising; a body having converging sides the faces of which include an angle approximately the angle to be gauged, a pair of fluid nozzles positioned in the sides of the body so that each nozzle lies in close proximity to a surface to be measured and will form a fluid leakage path therewith, a second pair of fluid nozzles positioned in the sides of the body so that each nozzle will form a fluid leakage path with the adjacent sides of an angle at a fixed distance from its vertex, means for supplying equal fluid flow to both pairs of nozzles, and pressure responsive means interconnecting the pairs of nozzles, changes in reading of the pressure responsive means indicating variations in size between angles successively gauged.

3. An angle gauging device comprising; a body having converging sides the faces of which include an angle approximating in size the angles gauged, means for supporting an angle to be gauged in spaced relationship with the sides of the body, a pair of fluid nozzles positioned in the sides of the body so that each nozzle will form a fluid leakage path near the vertex of adjacent sides of an angle, a second pair of fluid nozzles positioned in the sides of the body so that each nozzle with form a fluid leakage path of a spaced distance from the vertex of the adjacent sides of an angle, means for supplying equal fluid flow to both pairs of nozzles, and pressure responsive means interconnecting the pairs of nozzles, changes in the pressure responsive means indicating variations in size between angles successively gauged.

4. An angle gauging device comprising; a body having converging sides, means for supporting an angle in spaced interfitting relationship with sides of a body, a pair of fluid nozzles in the body positioned to form fluid leakage paths with the adjacent sides of an angle at its vertex, a second pair of fluid nozzles in the body positioned to form fluid leakage paths with the adjacent sides of an angle at a spaced distance from its vertex, means for adjusting the nozzles in approachment to and separation from the sides of the angle, means for supplying equal fluid flow to both pairs of nozzles, and pressure responsive means interconnecting the pairs of nozzles, changes in the reading of the pressure responsive means indicating variations in size between angles successively gauged.

5. An angle gauging device comprising; a body having converging sides, means for supporting an angle in spaced relationship with the body, balanced fluid supply means extending to said body and having two branch passages, a pair of nozzles in the body each forming fluid leakage paths with the adjacent sides of an angle at its vertex and connected in parallel with one of said branch passages, a second pair of fluid nozzles in the body forming fluid leakage paths with the adjacent sides of an angle at a spaced distance from its vertex and connected in parallel with one of said branch passages, a second pair of fluid nozzles in the body forming fluid leakage paths with the adjacent sides of an angle at a spaced distance from its vertex and connected in parallel with the other of said branch passages, and pressure responsive means interconnecting the pairs of nozzles, changes in the pressure responsive means indicating variations in size between angles successively gauged.

6. A gauging apparatus for comparing the sizes of unkown angles with known angles comprising; a body having converging sides, means for supporting an angle in spaced relationship with the body, balanced fluid supply means having two branch passages extending to said body, a pair of fluid nozzles disposed in the body each adapted to form fluid leakage paths with the adjacent sides of an angle at its vertex and connected in parallel with one of said branch passages, a second pair of fluid nozzles in the body each forming fluid leakage paths with the adjacent sides of an angle at a spaced distance from its vertex and connected in parallel with the other of said branch passages, pressure responsive means connected between each pair of nozzles for indicating difference in pressure therebetween, means for adjusting said nozzles towards and from a comparison angle of known size to balance the pressure in each pair of nozzles so that when an angle of unknown size is substituted for the comparison angle a change in the pressure responsive means will indicate angular variation from the angle of known size.

DON O. HENDRIX.
RUDOLPH M. LANGER.

REFERENCES CITED

The following references are of record in the file of this patent:

UNITED STATES PATENTS

| Number | Name | Date |
| --- | --- | --- |
| 2,019,066 | Balsiger | Oct. 29, 1935 |
| 2,490,376 | Rupley | Dec. 6, 1949 |